United States Patent
Hsieh et al.

(10) Patent No.: US 10,150,363 B2
(45) Date of Patent: Dec. 11, 2018

(54) SCOOTER-TYPE VEHICLE

(71) Applicant: YAMAHA HATSUDOKI KABUSHIKI KAISHA, Iwata-shi, Shizuoka (JP)

(72) Inventors: Chinyu Hsieh, Taoyuan (TW); Wenching Hsu, Taoyuan (TW)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 701 days.

(21) Appl. No.: 14/920,269

(22) Filed: Oct. 22, 2015

(65) Prior Publication Data

US 2016/0114671 A1 Apr. 28, 2016

(30) Foreign Application Priority Data

Oct. 24, 2014 (CN) .......................... 2014 1 0578531

(51) Int. Cl.
*B60K 15/01* (2006.01)
*B60Q 1/00* (2006.01)
(Continued)

(52) U.S. Cl.
CPC ............ *B60K 15/01* (2013.01); *B60Q 1/0041* (2013.01); *B60Q 1/0408* (2013.01); *B62J 6/02* (2013.01);
(Continued)

(58) Field of Classification Search
CPC .... B60K 15/01; B60Q 1/0041; B60Q 1/0408; B62J 37/00; B62J 35/00; B62J 6/02
(Continued)

(56) References Cited

U.S. PATENT DOCUMENTS

| 4,895,693 A * | 1/1990 | Suzuki ................. B60Q 1/0041 362/544 |
| 4,949,226 A * | 8/1990 | Makita ................. B60Q 1/0041 362/538 |

(Continued)

FOREIGN PATENT DOCUMENTS

| CN | 101301914 A | 11/2008 |
| CN | 101811536 A | 8/2010 |

(Continued)

OTHER PUBLICATIONS

Notice of Allowance issued by the European Patent Office in the counterpart EP application dated Feb. 14, 2017.
Translation of Taiwanese Search Report dated Oct. 21, 2015.

*Primary Examiner* — Joseph M Rocca
*Assistant Examiner* — Conan D Duda
(74) *Attorney, Agent, or Firm* — Rabin & Berdo, P.C.

(57) ABSTRACT

A scooter-type vehicle including a front vehicle cover covering a head pipe, a rear vehicle cover extending backwards from a foot rest and covering a space below a saddle, and a headlight unit disposed in front of the front vehicle cover. The headlight unit includes a reflector headlight, including a light source disposed at one side further right or left than the head pipe and a first reflector, and a projector headlight, including another light source disposed at the other side further right or left than the head pipe, a second reflector, and a lens disposed in front of the second light source in a convex shape toward the front. In a side view, a portion of the projector headlight overlaps with the reflector headlight. In a top view, a rear end of the reflector headlight is located further forward than a rear end of the projector headlight.

8 Claims, 7 Drawing Sheets

(51) Int. Cl.
  *B62J 6/02* (2006.01)
  *B62J 17/00* (2006.01)
  *B62J 17/02* (2006.01)
  *B62J 25/00* (2006.01)
  *B62J 35/00* (2006.01)
  *B62J 37/00* (2006.01)
  *B62K 11/10* (2006.01)
  *B60Q 1/04* (2006.01)

(52) U.S. Cl.
  CPC .............. *B62J 17/00* (2013.01); *B62J 17/02* (2013.01); *B62J 25/00* (2013.01); *B62J 35/00* (2013.01); *B62J 37/00* (2013.01); *B62K 11/10* (2013.01); *B62K 2202/00* (2013.01)

(58) Field of Classification Search
  USPC ........................................................ 180/219
  See application file for complete search history.

(56) References Cited

U.S. PATENT DOCUMENTS

| | | | | |
|---|---|---|---|---|
| 5,117,335 A * | 5/1992 | Yamada | ............... | B60Q 1/0041 362/544 |
| 5,156,445 A * | 10/1992 | Sato | ..................... | B60Q 1/0041 362/539 |
| 5,199,779 A * | 4/1993 | Sato | ..................... | B60Q 1/0041 362/538 |
| 5,285,358 A * | 2/1994 | Watanabe | ............ | B60Q 1/0041 362/538 |
| 5,394,310 A * | 2/1995 | Iwasaki | ............... | B60Q 1/0041 362/243 |
| 5,526,239 A * | 6/1996 | Sato | ..................... | B60Q 1/0041 362/232 |
| 5,546,284 A * | 8/1996 | Harada | ................ | B60Q 1/0041 362/487 |
| 5,833,345 A * | 11/1998 | Ito | ........................ | B60Q 1/0041 362/507 |
| 5,975,729 A * | 11/1999 | Dobler | ................ | B60Q 1/0041 362/507 |
| 6,059,436 A * | 5/2000 | Hashigaya | ........... | B60Q 1/0041 362/544 |
| 6,086,231 A * | 7/2000 | Kenjo | .................. | B29C 65/568 362/507 |
| 6,092,918 A * | 7/2000 | Ikegami | .............. | B60Q 1/0041 362/544 |
| 6,120,169 A * | 9/2000 | Sato | ..................... | B60Q 1/0041 362/517 |
| 6,129,448 A * | 10/2000 | Takasaki | .............. | B60Q 1/0041 362/543 |
| 6,193,400 B1 * | 2/2001 | Schuster | .............. | B60Q 1/0041 362/538 |
| 6,267,488 B1 * | 7/2001 | Muegge | ............... | B60Q 1/0041 362/351 |
| 6,270,241 B1 * | 8/2001 | Collot | .................. | B60Q 1/0041 362/544 |
| 6,497,506 B1 * | 12/2002 | Kakizoe | ............... | B60Q 1/0041 313/113 |
| 7,080,929 B2 | 7/2006 | Uemoto et al. | | |
| 8,857,553 B2 * | 10/2014 | Nakamura | ................. | F28D 1/00 180/219 |
| 2001/0019485 A1 * | 9/2001 | Kodaira | ............... | B60Q 1/0035 362/543 |
| 2001/0030874 A1 * | 10/2001 | Nishiyama | ........... | B60Q 1/0017 362/513 |
| 2001/0046139 A1 * | 11/2001 | Hashigaya | ........... | B60Q 1/0041 362/523 |
| 2002/0075695 A1 * | 6/2002 | Fujinami | .............. | B60Q 1/0041 362/517 |
| 2003/0133306 A1 * | 7/2003 | Kakizoe | ................... | B62J 6/001 362/475 |
| 2003/0142502 A1 * | 7/2003 | Kawai | .................. | B60Q 1/0035 362/475 |
| 2004/0052085 A1 * | 3/2004 | Tanaka | .................... | F21S 43/50 362/516 |
| 2005/0094411 A1 * | 5/2005 | Ishida | .................. | B60Q 1/0041 362/538 |
| 2005/0094413 A1 * | 5/2005 | Sazuka | ................ | B60Q 1/0041 362/544 |
| 2007/0058381 A1 * | 3/2007 | Domoto | ............... | B60Q 1/0041 362/475 |
| 2007/0236953 A1 * | 10/2007 | Nakazawa | ........... | B60Q 1/0041 362/544 |
| 2009/0154186 A1 * | 6/2009 | Natsume | .............. | B60Q 1/0041 362/516 |
| 2013/0100689 A1 * | 4/2013 | Ohashi | ....................... | B62J 6/02 362/476 |
| 2013/0258692 A1 * | 10/2013 | Oguchi | ................ | B60Q 1/2638 362/475 |
| 2016/0114851 A1 * | 4/2016 | Huang | ..................... | B62H 5/02 180/219 |
| 2016/0114857 A1 * | 4/2016 | Tseng | ........................ | B62J 1/00 180/219 |
| 2017/0190278 A1 * | 7/2017 | Kudou | ..................... | B60Q 1/04 |

FOREIGN PATENT DOCUMENTS

| | | |
|---|---|---|
| CN | 102089199 B | 5/2013 |
| CN | 1821001 B | 9/2013 |
| EP | 2221206 A1 | 8/2010 |
| JP | 05-092780 A | 4/1993 |
| JP | 05-198202 A | 8/1993 |
| JP | 2003-237663 A | 8/2003 |
| JP | 2010-215214 A | 9/2010 |
| JP | 2013-112295 A | 6/2013 |
| TW | 415405 U | 12/2000 |
| TW | I300042 B | 8/2008 |

\* cited by examiner

SCOOTER-TYPE VEHICLE

CROSS-REFERENCE TO RELATED APPLICATIONS

This application claims the priority, under 35 U.S.C. 119, of corresponding Chinese Patent Application No. 201410578531.9, filed Oct. 24, 2014, the entire content of which is hereby incorporated by reference.

BACKGROUND OF INVENTION

Field of the Invention

The present invention relates to a scooter-type vehicle, and in particular, to a configuration of headlights and a fuel feeding channel of such a vehicle.

Description of Related Art

Conventionally, scooter-type vehicles are known.

JP 2013-112295 A discloses a scooter-type vehicle with a headlight unit. The headlight unit has a reflector headlight and a projector headlight. The reflector headlight has a reflector to reflect light emitted from a light source forwards. A front surface of the projector headlight has a glass lens in a shape of a convex hemispherical curved surface towards the front. This allows light to be emitted from the light source to be reflected forwards by a reflector to pass through the lens.

In the scooter-type vehicle of JP 2013-112295 A, the headlight unit is configured such that the projector headlight and the reflector headlight are arranged in an up and down direction in front of the head pipe.

The scooter-type vehicle of JP 2013-112295 A is provided with a fuel feeding portion for refueling. The scooter-type vehicle is provided with a fuel feeding port of the fuel feeding portion at the front vehicle cover portion covering the head pipe.

A scooter-type vehicle may include a vehicle front-portion which may comprise a front vehicle cover portion, which may cover the periphery of a head pipe. The front vehicle cover portion may comprise a head lamp. The scooter-type vehicle may comprise a vehicle rear-portion, which may comprise a rear vehicle cover portion, which may cover a space below a saddle portion. The rear vehicle cover portion may comprise a power unit which may drive rear wheels. The scooter-type vehicle may comprise a foot rest portion, which may be located between the vehicle front-portion and/or the vehicle rear-portion in a front and back direction of the vehicle. In a side view of the vehicle, a foot rest space opened in a left and right direction may be formed, e.g. above the foot rest portion in the rear of the vehicle front-portion and in the front of the vehicle rear-portion. Moreover, in scooter-type vehicles with such a structure, weight balancing thereof may preferably be ensured respectively at the vehicle front-portion and the vehicle rear-portion.

Due to having a glass lens, the projector headlight may be heavier than the reflector headlight. Therefore, in the scooter-type vehicle of JP 2013-112295, weight balancing of the vehicle front-portion in a left and right direction of the vehicle is ensured by arranging the reflector headlight and the projector headlight in an up and down direction in front of the head pipe.

However, as the projector headlight has a lens in a front surface, the projector headlight structurally has a longer front and back direction than the reflector headlight. The headlight unit of JP 2013-112295 has a reflector headlight and the projector headlight disposed in front of the head pipe in a manner of being arranged in an up and down direction. In order not to interfere with a rotation range of a pair of front wheel supporting members, a rear end of the projector headlight, which is located lower in the two headlights and with a longer front and back direction, is located further forward than a rear end of the reflector headlight located above. As a result, the scooter-type vehicle of JP 2013-112295 is large-scale at the vehicle front-portion both in an up and down direction and in a front and back direction.

The scooter-type vehicle of JP 2013-112295 includes the fuel feeding opening portion of the fuel feeding portion which is located below the saddle portion. Therefore, in case of a fuel feeding operation, a rider or a fellow passenger must get down from the vehicle and then move to the back of the vehicle, to open the saddle portion to access the fuel feeding opening portion of the fuel feeding portion. Therefore, a problem of low convenience of the fuel feeding operation exists. In the scooter-type vehicle of JP 2010-215214 A, the fuel feeding opening portion of the fuel feeding portion is disposed at the front vehicle cover portion covering the head pipe. Therefore, in the scooter-type vehicle of JP 2010-215214 A, in case of a fuel feeding operation, a rider can immediately access the fuel feeding opening portion of the fuel feeding portion after getting down from the vehicle, which thus can enhance convenience of the fuel feeding operation. So, in the scooter-type vehicle of JP 2013-112295A where the reflector headlight and the projector headlight are arranged in an up and down direction in front of the head pipe, in a situation where it is intended to enhance convenience of the fuel feeding operation, in the scooter-type vehicle of JP 2013-112295A use of the structure in JP 2010-215214 A in which the fuel feeding opening portion of the fuel feeding portion is disposed at the front vehicle cover portion covering the head pipe is taken into account.

However, in the scooter-type vehicle of JP 2010-215214 A, the fuel feeding opening portion of the fuel tank is disposed at the vehicle front-portion, and the fuel feeding channel connecting the fuel feeding opening portion with the fuel tank disposed below the foot rest portion is also disposed at the vehicle front-portion; therefore, it is easy to make the vehicle front-portion large-scale in a front and back direction of the vehicle.

Hence, in the scooter-type vehicle of JP 2013-112295A, in a situation where the fuel feeding opening portion of the fuel feeding portion is disposed at the front vehicle cover portion covering the head pipe, as in JP 2010-215214 A, there is a risk that the vehicle front-portion to be further large-scale.

At least one object of at least one embodiment of the present invention has been developed in view of such circumstances, and its objective is to provide a scooter-type vehicle where a headlight unit includes a reflector headlight and a projector headlight, which, on the one hand, can inhibit the front portion of the vehicle from being large-scale, and on the other hand, can enhance convenience of a fuel feeding operation.

It is an object of at least one embodiment of at least one aspect of the present invention to obviate or at least mitigate one or more problems or disadvantages in the prior art.

BRIEF SUMMARY OF THE INVENTION

Various aspects of the present invention are defined in the independent claims. Some preferred features are defined in the dependent claims.

According to a first aspect of the present invention is a scooter-type vehicle. The vehicle may comprise a vehicle frame. The vehicle frame may include a head pipe. The vehicle may comprise a front wheel, which may be rotatably supported by the head pipe. The vehicle may comprise a saddle portion, which may be located further rearward than the head pipe. The vehicle may comprise a power unit, which may be supported by the vehicle frame. The power unit may be located below, e.g. directly underneath, the saddle portion in a side view of the vehicle. The vehicle may comprise a vehicle cover. The vehicle cover may include a foot rest portion, a front vehicle cover portion, and a rear vehicle cover portion. The foot rest portion may be disposed further forward and lower than the saddle portion. The front vehicle cover portion may extend upwards from a front or frontmost end of the foot rest portion and may cover the head pipe. The rear vehicle cover portion may extend backwards from a rear or rearmost end of the foot rest portion and may cover a space below, e.g. beneath or directly underneath, the saddle portion. The vehicle may comprise a headlight unit, which may be disposed at, in or on a front portion of the front vehicle cover portion. The vehicle may comprise a fuel tank which may be disposed below, e.g. beneath or directly underneath, the foot rest portion. The vehicle may comprise a fuel feeding portion which may feed fuel to the fuel tank. The vehicle may comprise a headlight unit. The headlight unit may include a reflector headlight, which may include a first light source. The first light source may be disposed at one side, e.g. further right or left than the head pipe. The reflector headlight may include a first reflector, which may reflect light from the first light source. The headlight unit may further include a projector headlight, which may include a second light source, which may be disposed at the other, e.g. opposite, side, e.g. further to the other of right or left than the head pipe, e.g. than the first light source. The projector headlight may comprise a second reflector, which may reflect light from the second light source. The projector headlight may comprise a lens, which may be disposed in front of the second light source. The lens may be disposed in a convex shape toward the front of the vehicle. In a side view, e.g. of the vehicle, the projector headlight may be disposed such that a portion thereof overlaps with the reflector headlight. In a top view of the headlight unit, a rear end of the reflector headlight may be located further forward than a rear end of the projector headlight. The fuel feeding portion may include a fuel feeding opening portion, which may be disposed at a rear, rearward or rearmost portion of the front vehicle cover portion. The fuel feeding opening portion may be disposed at the one side, e.g. further to the right or left side than the head pipe. The fuel feeding portion may comprise a fuel feeding channel, which may be disposed at the one side inside the front vehicle cover portion, and which may connect the fuel feeding opening portion with the fuel tank.

In the scooter-type vehicle of the present invention, the reflector headlight and the projector headlight may be respectively arranged to the left and right at, in or on the front vehicle cover portion by taking the head pipe as the center, which may inhibit the vehicle front-portion, which may include the front vehicle cover portion, from being large-scale in an up and down direction, compared with disposing the reflector headlight and the projector headlight in an up and down direction.

Moreover, compared with disposing the reflector headlight and the projector headlight in front of the head pipe, in the scooter-type vehicle of the present invention, as the reflector headlight and the projector headlight may be disposed by effectively using a space further left or right than the head pipe, the degree of freedom of configuration of the reflector headlight and the projector headlight in a front and back direction of the vehicle may be enhanced without interfering with the head pipe. So, the vehicle front-portion, which may include the front vehicle cover portion, may be inhibited from being large-scale in the front and back direction of the vehicle.

However, it may be difficult to ensure weight balancing of the vehicle front-portion as the reflector headlight and the projector headlight with different weight are respectively disposed further right and left than the head pipe. In the scooter-type vehicle of the present invention, to enhance convenience of the fuel feeding operation, the fuel feeding portion is disposed at, in or on the rear, rearward or rearmost portion of the front vehicle cover portion, and further right or left than the head pipe. Therefore, in the scooter-type vehicle of the present invention, the lighter reflector headlight and the fuel feeding portion may be disposed at one side further right or left than the head pipe, and the heavier projector headlight may be disposed at the other side further right or left than the head pipe. Therefore, unevenness of weight balancing in the single headlight unit may be made up for by using the fuel feeding portion disposed at one side in a left and right direction of the vehicle, which may reduce effects of a configuration of the headlight unit on unevenness produced by weight balancing of the vehicle front-portion in a left and right direction of the vehicle, so as to ensure the weight balancing of the vehicle front-portion in the left and right direction of the vehicle.

In addition, in the scooter-type vehicle, the reflector headlight, whose front-and-back-direction length may be shorter than that of the projector headlight, may be disposed such that the rear end thereof is located further forward than the rear end of the projector headlight. As such, flexible use of the space in the rear of the reflector headlight may be effectively made, which may thereby enhance the degree of freedom of configuration of the fuel feeding portion in a front and back direction of the vehicle. Therefore, in a situation where the reflector headlight and the fuel feeding portion are front-and-back disposed in a left or right direction of the vehicle, even if the vehicle front-portion is not large-scale in the front and back direction of the vehicle, the fuel feeding portion may also be disposed in a manner of not interfering with the reflector headlight. So, the vehicle front-portion being large-scale in the front and back direction of the vehicle caused by configuration of the fuel feeding portion may be inhibited while weight balancing of the vehicle front-portion in a left and right direction is ensured.

On the basis of the above, the scooter-type vehicle may have a projector headlight, which may inhibit the vehicle front-portion from being large-scale while enhancing convenience of fuel feeding operation.

The reflector headlight may be a different type of headlight to the projector headlight. The projector headlight may comprise the lens, e.g. the convex lens. The reflector headlight may not comprise a lens, e.g. a glass lens, such as a convex lens, which may be convex toward the front of the vehicle. The reflector headlight may be or comprise a high or full beam headlight. The projector headlight may be or comprise a low beam or dipped headlight. The projector headlight may comprise a light shielding member which may be disposed forwardly of the second reflector, e.g. between at least part of the second reflector and at least part of the lens. The shielding member may comprise a hole, e.g. a crescent shaped hole, which may be in a light shielding sheet or structure.

The headlight unit may comprise a headlight cover. The headlight cover may comprise a left lens and/or a right lens. One of the left or right lenses of the headlight cover may correspond with the reflector headlight, the other of the left or right lenses of the headlight cover may correspond with the projection headlight.

The reflector headlight and the projector headlight may be comprised in a headlight body, which may optionally be separate from the headlight cover.

At least part of or the entire fuel feeding portion may be disposed to the rear of, e.g. behind or directly behind, the reflector headlight. At least a part of the fuel feeding opening portion may overlap with the reflector headlight when viewed from the front. A part, such as a largest part or most, or all of the fuel feeding portion and/or the fuel feeding opening portion, may be arranged behind or directly rearwardly of the reflector headlight or be in-line with the reflector headlight in the front-back direction of the vehicle or headlight unit when viewed from above.

In a side view of the vehicle, the fuel feeding portion may be disposed such that at least a portion thereof may overlap with the head pipe in a front and back direction of the vehicle, and/or in an up and down direction of the vehicle, and may be located between a horizontal line passing through an upper or upmost end of the headlight unit and a horizontal line passing through a lower or lowermost end of the headlight unit.

In this way, the rear end of the reflector headlight may be disposed further forward than the rear end of the projector headlight. In addition, in a side view, the fuel feeding portion may be disposed such that at least a portion thereof may overlap with the head pipe in a front and back direction of the vehicle, and, in an up and down direction of the vehicle, located between a horizontal line passing through an upper end of the headlight unit and a horizontal line passing through a lower end of the headlight unit. As such, flexible use of the space in the rear of the reflector headlight can be effectively made to configure the fuel feeding portion. Therefore, the vehicle front-portion being large-scale in the front and back direction of the vehicle caused by configuration of the fuel feeding portion may be further inhibited while weight balancing of the vehicle front-portion in the left and right direction may be ensured.

The fuel feeding channel may include a sub tank and a fuel feeding pipe. The fuel feeding pipe may be inserted into the sub tank disposed below the fuel feeding opening portion. In a side view, the headlight unit may be disposed so as to overlap with at least a portion of the sub tank in the up and down direction of the vehicle and may overlap with at least a portion of the sub tank in the front and back direction of the vehicle.

The sub tank may be disposed with a height substantially the same as that of the headlight unit. In a side view, at least a portion of the sub tank may overlap with the headlight unit in the front and back direction of the vehicle, which may inhibit the vehicle front-portion from being large-scale both in an up and down direction and in a front and back direction while preferably ensuring weight balancing of the vehicle front-portion in a left and right direction of the vehicle.

In a front view, at least a portion of the first reflector of the reflector headlight may overlap with a center line of the head pipe, and/or at least a portion of the second reflector of the projector headlight may overlap with the first reflector of the reflector headlight.

The scooter-type vehicle of the present invention may be disposed such that at least a portion of the first reflector of the reflector headlight may overlap with a center line of the head pipe, and at the same time, may be disposed in a manner that at least a portion of the second reflector of the projector headlight may overlap with the first reflector of the reflector headlight. Thus, the reflector headlight and the projector headlight may be disposed in a manner of being close to each other as much as possible in a left and right direction of the vehicle, and the headlight unit may be inhibited from being large-scale in a left and right direction of the vehicle even if the reflector headlight and the projector headlight are arranged left and right. Therefore, the vehicle front-portion may be inhibited from being large-scale.

It will be appreciated that features analogous to those described in relation to any of the above aspects may be individually and separably or in combination applicable to any of the other aspects.

Apparatus features analogous to, or configured to implement, those described above in relation to a method and method features analogous to the use and fabrication of those described above in relation to an apparatus are also intended to fall within the scope of the present invention.

BRIEF DESCRIPTION OF THE DRAWINGS

An embodiment of the present invention will now be described, by way of example only, with reference to the accompanying drawings, in which.

DETAILED DESCRIPTION OF THE INVENTION

A vehicle of the present invention, in this particular example, but not exclusively a scooter-type vehicle, is described below in detail on the basis of one embodiment shown in the accompanying drawings.

In the illustration below, the directions of front, rear, left, and right represent the directions of front, rear, left, and right as observed by a rider of the scooter-type vehicle 1, respectively. In addition, the sign Fr in FIG. 1 indicates the front.

Figure 1:
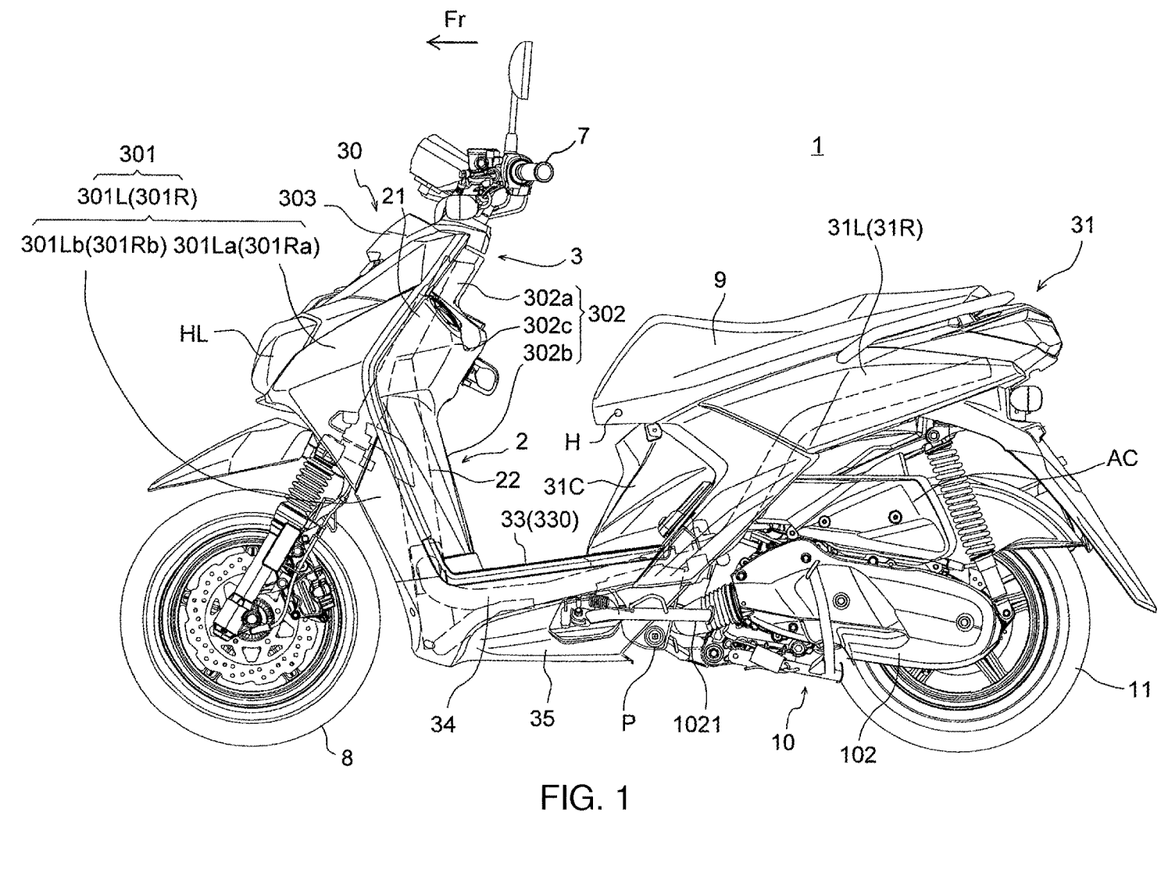
FIG. 1 is a left side view of a scooter-type vehicle according to the present invention.
Figure 2:
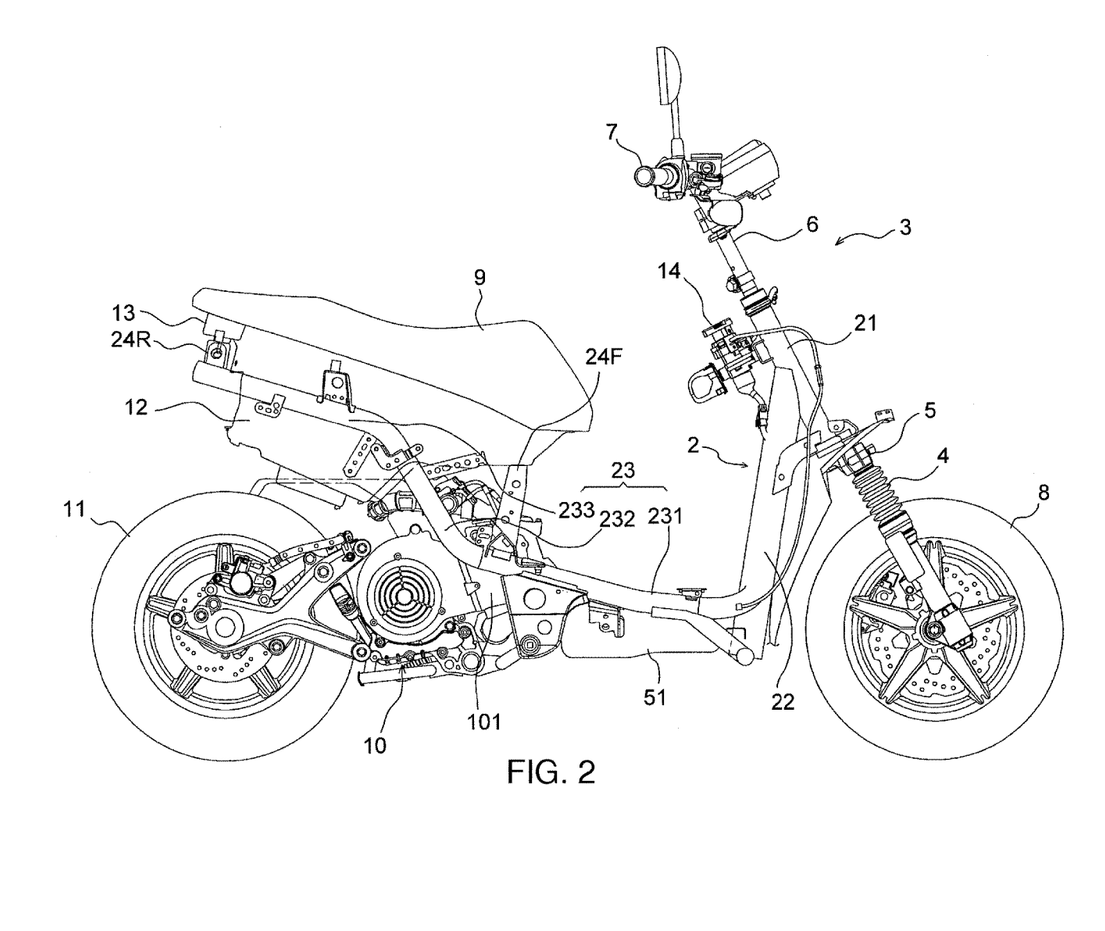
FIG. 2 is a right side view of the scooter-type vehicle of FIG. 1 in a state where a vehicle cover is removed.
Figure 3:
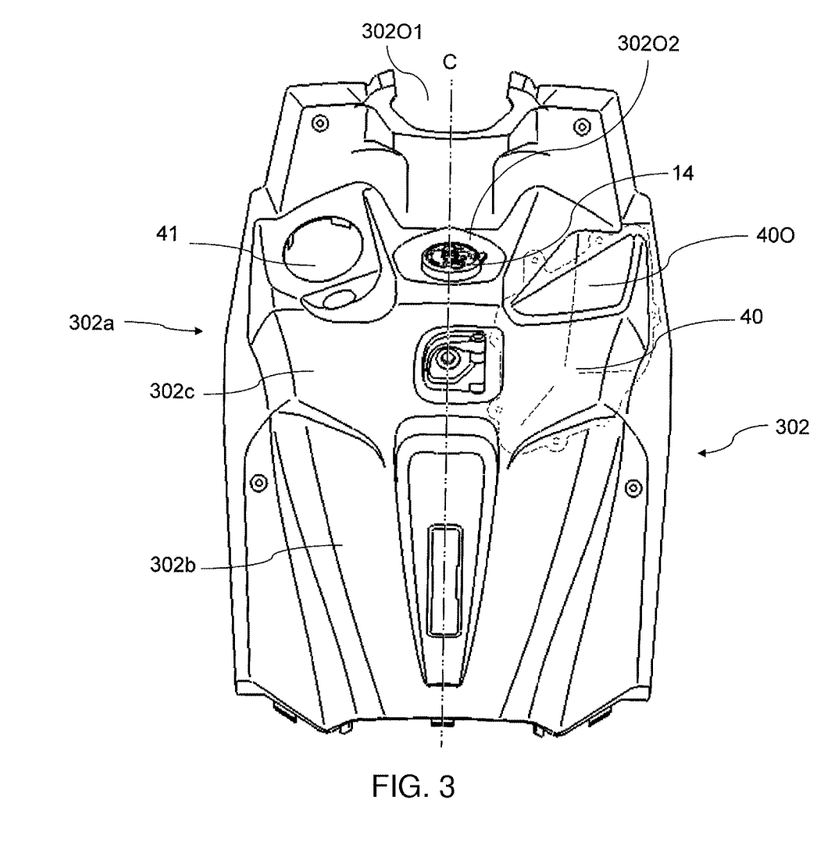
FIG. 3 is a rear view of appearance of a vehicle front-portion structure of the scooter-type vehicle of FIG. 1 and FIG. 2.
Figure 4:
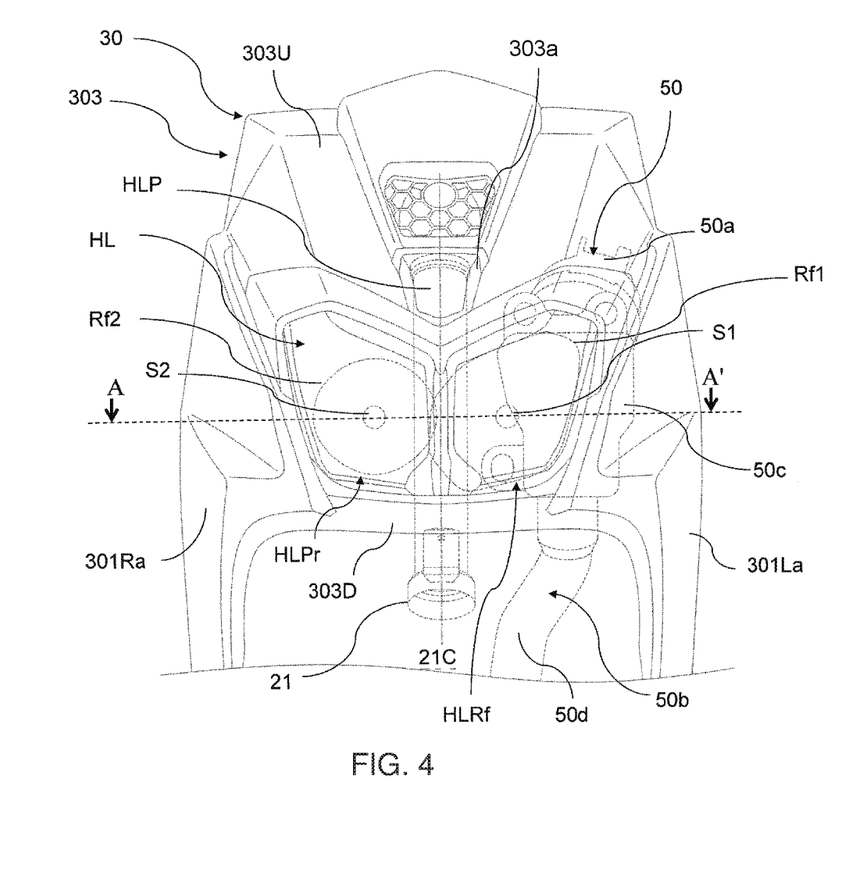
FIG. 4 is a partially enlarged front view of a part of the structure of the vehicle front-portion of the scooter-type vehicle of FIG. 1 to FIG. 3.
Figure 5:
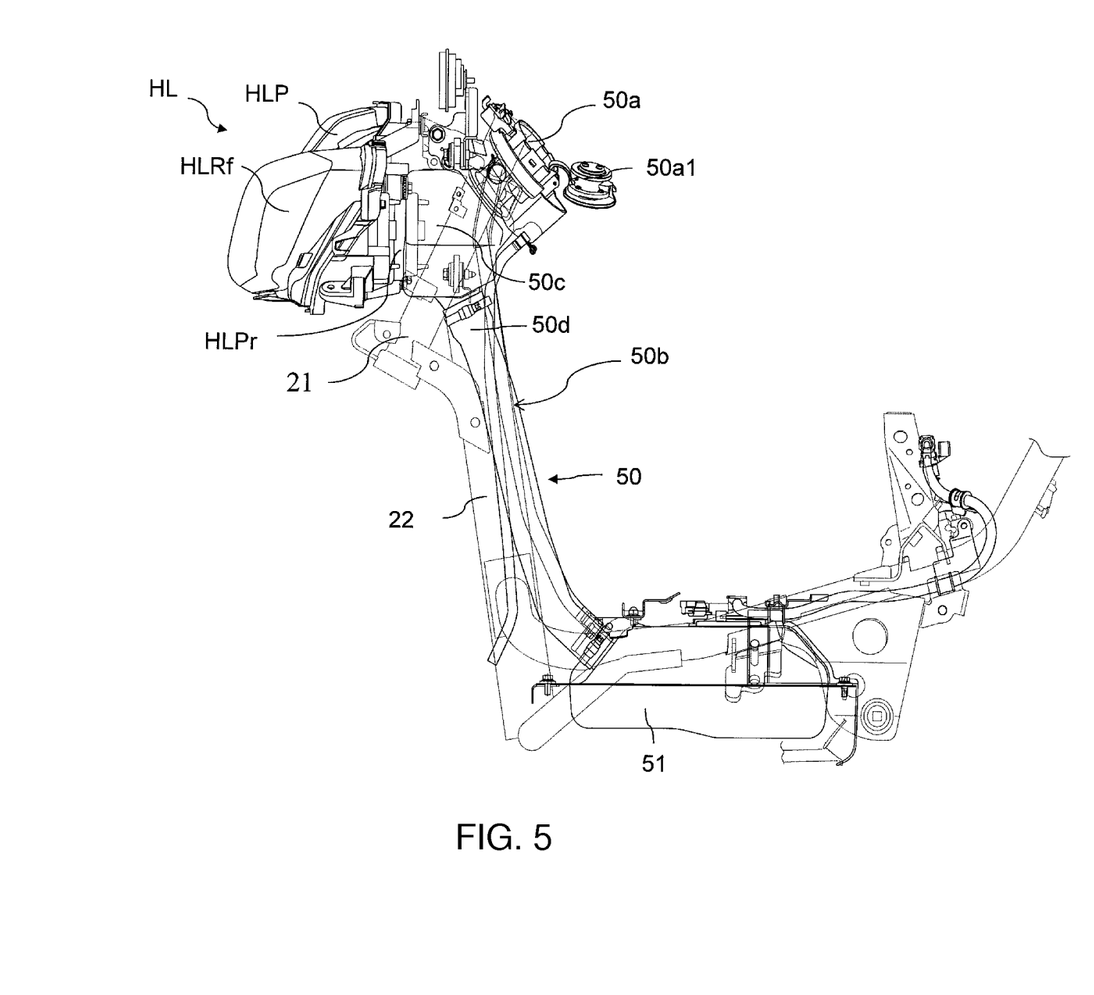
FIG. 5 is a left side view indicating configuration of a headlight unit and a fuel feeding portion of the scooter-type vehicle of FIG. 1 to FIG. 4 in the state where the vehicle cover is removed.
Figure 6:
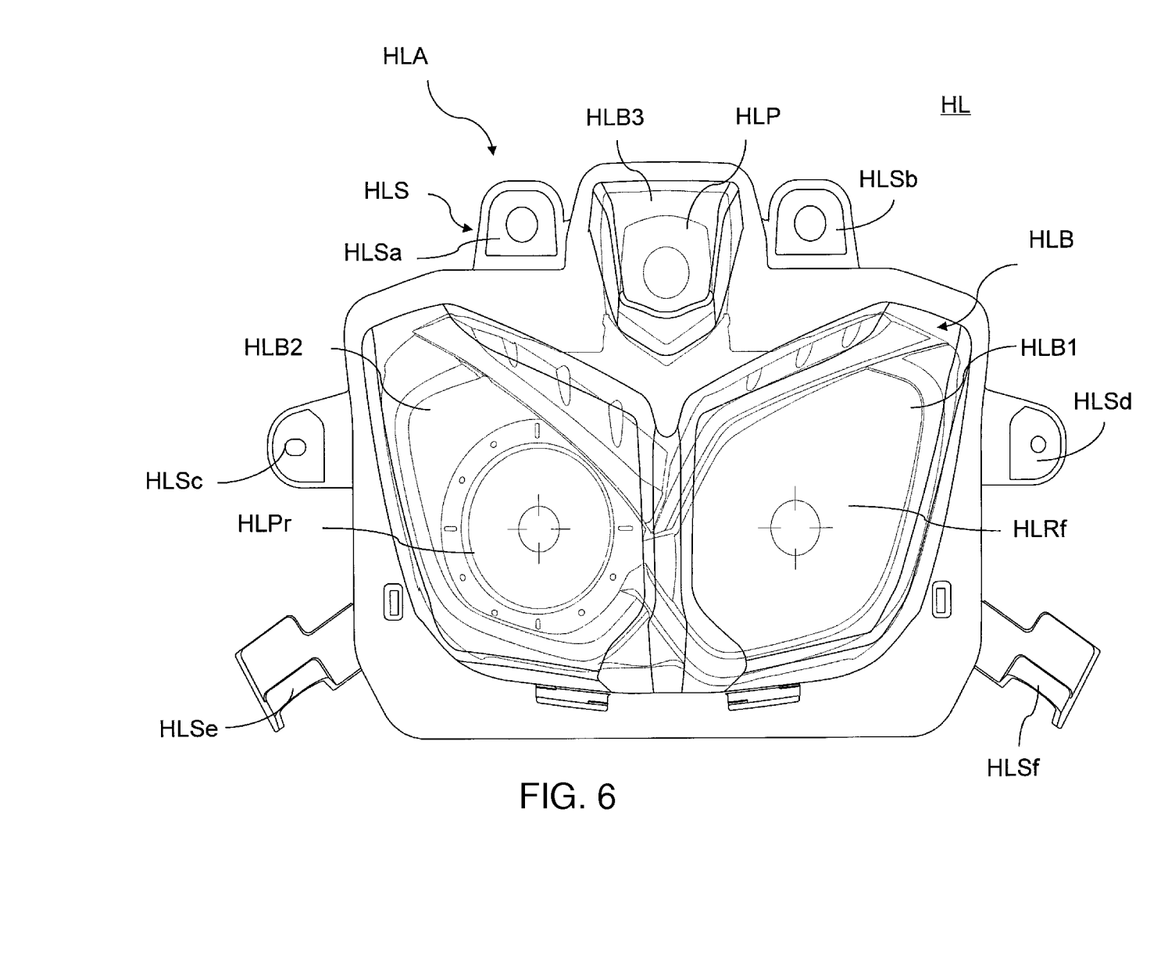
FIG. 6 is a front view of a single headlight unit.
Figure 7:
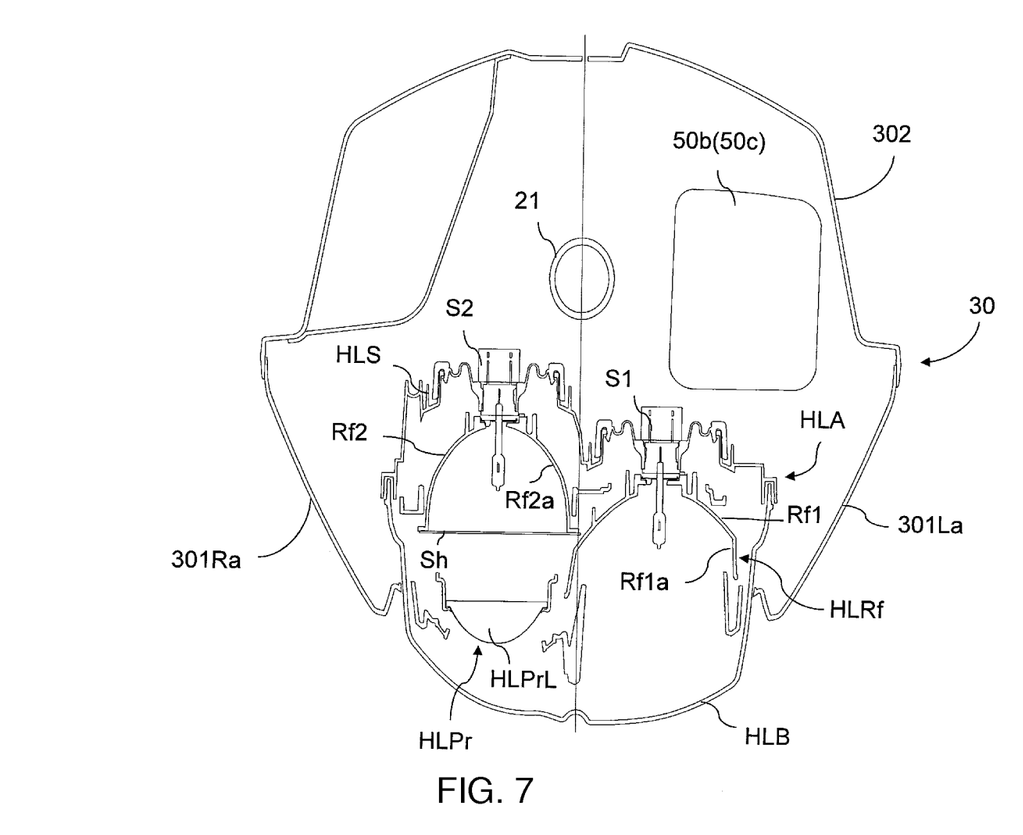
FIG. 7 is a view of an A-A' line profile of FIG. 4 observed above.

FIG. 1 is a left side view of a scooter-type vehicle 1 according to the present invention, where a vehicle frame 2 blocked by a vehicle cover is represented with dotted lines. FIG. 2 is a right side view of the scooter-type vehicle 1 in a state where a vehicle cover is removed according to the present invention. FIG. 3 is a rear view of appearance of a vehicle front-portion structure of the scooter-type vehicle 1 according to the present invention, where an internal structure of a storage portion 40 is represented with dotted lines. FIG. 4 is a partially enlarged front view of a part of the structure of the vehicle front-portion of the scooter-type vehicle 1 according to the present invention, where a head pipe 21 is represented with dotted lines, and a steering mechanism 3 and a front wheel 8 and the like are omitted. FIG. 5 is a left side view indicating configuration of a headlight unit HL and a fuel feeding portion 50 of the scooter-type vehicle 1 in the state where the vehicle cover is removed according to the present invention, where the vehicle frame 2 is represented with dotted lines. FIG. 6 is a front view of a single headlight unit HL. FIG. 7 is a view of an A-A' line profile of FIG. 4 observed above.

The Whole Vehicle

The scooter-type vehicle 1 is a so-called "underbone type" scooter-type vehicle. As shown in FIG. 1 and FIG. 2, a front end portion of the underbone type vehicle frame 2 supports the steering mechanism 3 for controlling a direction of the front wheel 8, and a central portion of the vehicle frame 2 can take a pivot portion P as a center to support a swing type power unit 10 in a swinging or shaking up and down manner. Above the power unit 10, a saddle portion 9 is mounted, and the saddle portion 9 takes a hinge pin H in its front end portion as a rotation center and can be opened and closed relative to a storage box 12.

As shown in FIG. 2, the steering mechanism 3 includes a pair of front suspensions 4, a steering bracket 5, a steering shaft 6 and a handle 7. The front suspensions 4 extend forwards in a downward oblique direction, and a lower end thereof is provided with a front wheel 8. Upper ends of the front suspensions 4 are mounted to the steering bracket 5 fixedly disposed at a lower end portion of the steering shaft 6. An upper end of the steering shaft 6 is provided with the handle 7 for the rider to operate. The front wheel 8, with the rider operating the handle 7, rotates in a deflecting left and right manner relative to a center line extending in a front and back direction centrally in the left and right direction of the vehicle.

As shown in FIG. 1 and FIG. 2, the power unit 10, for example, has an engine 101 and a V-type belt continuously variable transmission disposed in a transmission case 102 extending from a side of the engine 101 to the rear of the vehicle, and is a structure in which the engine 101 and the transmission case 102 are integrated. The engine 101 is carried in a manner of making a cylinder axis face a substantially horizontal front direction. The front end portion of the transmission case 102 is connected to an air duct 1021, which takes in external air for dissipating heat generated by friction of the belt of the V-type belt continuously variable transmission. In a rear end portion of the transmission case 102, a rear wheel 11 driven by a driving force of the engine 101 is supported rotatably. Above the transmission case 102, an air cleaner AC filtering external air supplied to the engine 101 is disposed. Moreover, the engine 101 and the transmission case 102 may not be integrated but may be of separate structures. Moreover, the scooter-type vehicle of the present invention is not limited to two-wheel motorcycles, and also includes scooter-type vehicles in the form of three-wheel motorcycles.

Vehicle Frame

As shown in FIG. 2, the vehicle frame 2 includes: a head pipe 21, for insertion of a steering shaft 6 to make the steering shaft 6 rotatably supported and extending obliquely and downwards toward a front direction of the vehicle; a front frame portion 22, for example, welded onto the head pipe 21 and extending obliquely and downwards toward a rear direction of the vehicle, and located further rearward than the front wheel 8; and a rear frame portion 23, welded onto a lower portion of the front frame portion 22, extending backwards, and supporting the saddle portion 9 from the lower side.

The front frame portion 22 is preferably formed by a pipe member and, in a front view, overlaps with the front wheel when the steering mechanism 3 does not rotate (that is, the state where the front wheel 8 does not deflect relative to the center line extending in the front and back direction centrally in the left and right direction of the vehicle). However, the front frame portion 22 is not limited thereto, and may also be formed by two or more pipe members. Also, as shown in FIG. 2, in a side view, a main switch unit 14 is disposed near a connecting portion between the head pipe 21 and the front frame portion 22.

The rear frame portion 23 includes: a pair of rear frame portions 231 including left and right rear frame portions 231, welded onto the lower portion of the front frame portion 22, and extending backwards at a gentle gradient; a pair of middle rear frame portions 232 including left and right middle rear frame portions 232, extending backwards and upwards at a steep gradient from respective rear portions of the respective left and right lower rear frame portions 231; and a pair of upper rear frame portions 233, including left and right upper rear frame portions 233, extending backwards and upwards at a gentle gradient from respective rear portions of the respective left and right middle rear frame portions 232, and supporting the saddle portion 9 from the lower side.

Also, respective rear end portions of the respective left and right lower rear frame portions 231 and the left and right upper rear frame portions 233 are connected by cross frames 24F and 24R, that are substantially U-shaped in a front view having an opening of the U-facing downwards. The saddle portion 9 and the storage box 12 are supported by the cross frames 24F and 24R and the upper rear frame portions 233 pairing left and right. Moreover, as shown in FIG. 1 and FIG. 2, when the saddle portion 9 is closed relative to the storage box 12 with a hinge pin H as the center of rotation, the saddle portion 9 is locked by engaging a saddle portion closing mechanism 13 disposed at the saddle portion 9 and a locking portion disposed at the cross frame 24R.

The lower rear frame portions 231, the middle rear frame portions 232 and the upper rear frame portions 233 are more preferably continuous pipe members, and are set left and right in pairs, but a part or all thereof may also be formed by one or more than two pipe members. Then, the lower rear frame portions 231 may be welded onto the lower end portion of the front frame portion 22, and may also be welded onto "parts other than the lower end portion" in a lower portion of the front frame portion 22.

Moreover, the vehicle frame of the present invention is not limited to the above forms. For example, the method of connecting the vehicle frame is not limited to soldering, but may be fixed with bolts or the like and may also be integrally manufactured through casting. Besides, the vehicle frame is not limited to pipe members and may also be a cast frame, for example, and a profile thereof is not limited to a round shape and may also be an angular shape. Various changes may be made within a possible range.

Vehicle Cover

The vehicle cover includes a front vehicle cover portion 30, a rear vehicle cover portion 31 and a pedal or footboard 33.

As shown in FIG. 1, the front vehicle cover portion 30 is disposed around the steering mechanism 3, the head pipe 21 and the front frame portion 22. As shown in FIG. 1 and FIG. 2, the rear vehicle cover portion 31 is disposed below the saddle portion 9 and around the storage box 12. The pedal or footboard 33 as a low baseplate of the foot rest portion is disposed between the front vehicle cover portion 30 and the rear vehicle cover portion 31, for the rider to place his/her feet.

The rear vehicle cover portion 31 includes a left cover portion 31L on the left side of the storage box 12, a right cover portion 31R on the right side of the storage box 12, and a central cover portion 31C extending backwards and upwards from a rear end of the pedal 33.

The front vehicle cover portion 30 includes a side cover portion 301 located on or to a side of the head pipe 21, a rear cover portion 302 on or to the rear of the head pipe 21, and a front cover portion 303 in front of the head pipe 21. Also, in this embodiment, the front portion of the front vehicle cover portion 30 and the rear portion of the front vehicle cover portion 30 refer to the front and the rear when the front vehicle cover portion 30 including the side cover portion 301, the rear cover portion 302 and the front cover portion 303 is cut with a plane including the head pipe 21 extending in a left and right direction. In other words, the front portion of the front vehicle cover portion 30 is a portion of the front vehicle cover portion 30 having a surface toward the front, and the rear portion of the front vehicle cover portion 30 is a portion of the front vehicle cover portion 30 having a surface facing backwards.

The rear cover portion 302 of the front vehicle cover portion 30 has an upper rear cover portion 302a and a lower rear cover portion 302b. The upper rear cover portion 302a extends rearwards from the front in an upward inclined manner and is disposed to cover from the back of the head pipe 21. The lower rear cover portion 302b extends rearwards from a lower edge of the upper rear cover portion 302a in a downward inclined manner, is connected with a front end of the pedal 33 and is disposed to cover the front frame portion 22 from the back. Also, the upper rear cover portion 302a of the rear cover portion 302 includes an upper protruding cover portion 302c protruding toward the back of the vehicle. The main switch 14 and the fuel feeding portion 50 are disposed inside the rear cover portion 302, the main switch 14 is exposed from an opening 302O2 disposed at the upper protruding cover portion 302c, and the fuel feeding portion 50 is exposed from an opening portion 41 disposed at the upper protruding cover portion 302c.

The side cover portion 301 of the front vehicle cover portion 30 includes a left-side cover portion 301L on the left side of the head pipe 21 and a right-side cover portion 301R on the right side of the head pipe 21. The left-side cover portion 301L includes a left-side upper cover portion 301La, and a left-side lower cover portion 301Lb separated from the left-side upper cover portion 301La. The right-side cover portion 301R includes a right-side upper cover portion 301Ra and a right-side lower upper portion 301Rb separated from the right-side upper cover portion 301Ra. However, the left-side lower cover portion 301Lb and the right-side lower upper portion 301Rb may also not be disposed separately. The left-side upper cover portion 301La and the right-side upper cover portion 301Ra are concavely curved toward the front of the vehicle, and are boomerang-shaped in a side view of the vehicle.

As shown in FIG. 1 and FIG. 4, the front cover portion 303 of the front vehicle cover portion 30 includes an upper front cover portion 303U located above the headlight unit HL, and a lower front cover portion 303D located below the headlight unit HL.

As shown in FIG. 3, at a central portion in a left and right direction of the rear cover portion 302 of the front vehicle cover portion 30, an opening portion 302O1 for inserting of the steering mechanism 3 is disposed at an upper end of the upper rear cover portion 302a. Lower than the opening portion 302O1, an opening portion 302O2 for exposing a key insert hole of the main switch unit 14 is disposed on an upper surface of the upper protruding cover portion 302c.

Also, the fuel feeding opening portion 50a of the fuel feeding portion 50 is disposed at the rear cover portion 302 of the front vehicle cover portion 30. The fuel feeding opening portion 50a of the fuel feeding portion 50 is exposed from an opening portion 41 of the rear cover portion 302 of the front vehicle cover portion 30. As shown in FIG. 3, to expose the fuel feeding opening portion 50a of the fuel feeding portion 50, the opening portion 41 is disposed on the left side of a center line C of the rear cover portion 302. It is more preferable that the size of opening of the opening portion 41 is greater than that of the opening portion 302O1.

More preferably, a storage portion 40 that can receive bottles and the like may be disposed integrally with the rear cover portion 302 on the right side of the center line C of the rear cover portion 302. However, it is also feasible that the storage portion 40 and the rear cover portion 302 are not integral. The storage portion 40 has an opening portion 40O opened upwards, and the opening portion 40O is located further right than the opening portion 302O2.

As shown in FIG. 4, at the front vehicle cover portion 30, an H-shaped cover body substantially H-shaped in a front view is formed through the lower cover portion 303D of the front cover portion 303, the left-side upper cover portion 301La and the right-side upper cover portion 301Ra. In the implementation form, the lower cover portion 303D is formed integrally with the left-side upper cover portion 301La and the right-side upper cover portion 301Ra in a manner of connecting the left-side upper cover portion 301La and the right-side upper cover portion 301Ra. An opening portion integrally formed in an upper portion of the H-shaped cover body is used for configuring spaces of the headlight unit HL and the upper cover portion 303U. In addition, the lower cover portion 303D located below the headlight unit HL is preferably in contact with the headlight unit HL. In such a case, the headlight unit HL can be supported from the lower side through the lower cover portion 303D. In a state where the upper cover portion 303U has been mounted to the vehicle body, the upper cover portion 303U is provided with an opening portion 303a exposing a position lamp HLP of the headlight unit HL.

The H-shaped cover body is fixed to the back of the head pipe 21 and mounted to the rear cover portion 302 of the vehicle frame. In addition, the H-shaped cover body is fixed and mounted to the headlight unit HL of the vehicle frame. In addition, the upper cover portion 303U is fixed to the back of the head pipe 21 and mounted to the rear cover portion 302 of the vehicle frame.

Moreover, as shown in FIG. 1, the pedal or footboard 33 extends rearwards substantially horizontally from a connecting portion at a lower end of the rear cover portion 302. The pedal or footboard 33, is connected with a lower end of the central cover portion 31C, and has a foot placing portion 330 for the rider to place feet. In this way, in a side view of the vehicle body, a foot rest space opened in a left and right direction is formed between the front vehicle cover portion 30 and the rear vehicle cover portion 31 and above, e.g. directly above or overhead of, the foot placing portion 330.

On left and right sides of the pedal or footboard 33, a pair of pedal-side cover portions 34 are formed in a manner of hanging downwards from left and right edges of the pedal or footboard 33, and below the pedal or footboard 33, a profile in a left and right direction of the vehicle is a U-shaped bottom cover portion 35 formed between the pair of pedal-side cover portions 34. Moreover, below (e.g. beneath or directly underneath) the pedal or footboard 33, the fuel tank 51 as shown in FIG. 2 and FIG. 5 is disposed between the left and right lower rear frame portions 231.

The front vehicle cover portion 30, the rear vehicle cover portion 31, the pedal 33 and other vehicle covers described above are exterior components, and can be separately formed with plastic and other appropriate materials. Although each cover component is an integral product by injection molding, they also can be formed by a plurality of components. For example, at the front vehicle cover portion 30 in the implementation form, the rear front vehicle cover portion 302 makes the upper rear cover portion 302a integral with the lower rear cover portion 302b, and makes the H-shaped cover body formed by the left-side upper cover portion 301La, the right-side upper cover portion 301Ra and a lower front cover portion 303D, which may also be separately disposed. Moreover, they may also be formed by a plurality of members. Furthermore, it is preferable that the vehicle cover is wholly presented in bilateral symmetry in terms of appearance and manufacturing.

Headlight Unit HL

As shown in FIG. 1, the headlight unit HL is at a front portion of the front vehicle cover portion 30, further upward than, e.g. above or directly above, the front wheel and lower than the handle 7. The headlight unit HL is disposed in the front portion of the front vehicle cover portion 30. The headlight unit HL is exposed from the opening portion in the upper portion of the H-shaped cover body in the front portion of the front vehicle cover portion 30. The headlight unit HL is supported by the vehicle frame. The headlight unit HL may also be supported by the vehicle frame via the vehicle cover.

The headlight unit HL is described in detail with reference to FIGS. 4, 6 and 7.

As shown in FIG. 6 and FIG. 7, the headlight unit HL includes a headlight body HLA and a headlight cover HLB.

As shown in FIG. 6, the headlight body HLA includes a reflector headlight HLRf and a projector headlight HLPr arranged left and right, a position lamp HLP disposed in a higher position centrally and a support member HLS, and the reflector headlight HLRf and the projector headlight HLPr may be selectively lighted. Light emitted by the reflector headlight HLRf is used as high-beam light, and light emitted by the projector headlight HLPr is used as low-beam light.

As shown in FIG. 7, the headlight unit HL includes the reflector headlight HLRf and the projector headlight HLPr.

As shown in FIG. 5, the headlight unit HL further includes the position lamp HLP.

As shown in FIG. 5, in a side view, the headlight unit HL is disposed further forward than the head pipe 21. In a side view, the front-and-back-direction length of the reflector headlight HLRf is shorter than that of the projector headlight HLPr. In a side view, the projector headlight HLPr is disposed such that a portion thereof overlaps with the reflector headlight HLRf.

As shown in FIG. 7, the reflector headlight HLRf has a light source S1 located at a rear end thereof and disposed further left than the head pipe 21. A reflector Rf1 reflects light from the light source S1. The projector headlight HLPr has a light source S2 at a rear end thereof and disposed further right than the head pipe 21, a reflector Rf2 reflecting light from the light source S2, and a glass lens HLPrL disposed in front of the light source S2 and in a shape of being convex toward the front of the vehicle. The projector headlight HLPr further has a crescent-shaped through hole as a light shielding member Sh of a light shading sheet.

The projector headlight HLPr has the glass lens HLPrL in the convex shape toward the front of the vehicle. Therefore, a weight of the projector headlight HLPr is greater than that of the reflector headlight HLRf.

The light source S1 and the light source S2 are, for example, halogen lamps. The lens HLPrL is located at a front end of the projector headlight HLPr, a front surface is a semispherical curved surface in a convex shape toward the front, and a rear surface is a flat surface expanding in an up and down direction and in a left and right direction.

At the reflector headlight HLRf, the reflector Rf1 has a concave portion Rf1a opened forwards, and the light source S1 is disposed in the concave portion Rf1a. In this way, light emitted by the light source S1 is reflected by the reflector Rf1 toward the front of the vehicle body.

At the projector headlight HLPr, the reflector Rf2 has a concave portion Rf2a opened forwards, and the light source S2 is disposed in the concave portion Rf2a. In this way, light emitted by the light source S2 is reflected by the reflector Rf2 toward the front of the vehicle body and passes through the lens HLPrL. Moreover, to avoid that light reflected toward the upper side of the vehicle body to affect the line of sight, in a front view of the light shielding member Sh, the curved surface of the crescent-shaped through hole is disposed upwards, and is disposed between the reflector Rf2 and the lens HLPrL in a top view. In this way, at the projector headlight HLPr, the reflected light advancing upwards from the lower side of the vehicle body can be shielded by the light shielding member Sh.

The support member HLS supports the reflector headlight HLRf, the projector headlight HLPr and the position lamp HLP. The reflector headlight HLRf secures the light source S1 to the left portion of the support member HLS, and the projector headlight HLPr secures the light source S2 to the right portion of the support member HLS.

As shown in FIG. 6, the headlight cover HLB includes a transparent left lens HLB1, a right lens HLB2 and a central lens HLB3. In a front view, in the headlight cover HLB, the left lens HLB1, the right lens HLB2 and the central lens HLB3 are respectively engaged with the support member HLS in a manner of corresponding to configuration positions of the reflector headlight HLRf, the projector headlight HLPr and the position lamp HLP.

As shown in FIG. 6, the support member HLS includes a fixing portion HLSa, a fixing portion HLSb, a fixing portion HLSc, a fixing portion HLSe, a fixing portion HLSd and a fixing portion HLSf. At an upper portion of the support member HLS, the fixing portion HLSa and the fixing portion HLSb are disposed on left and right sides of the position lamp HLP. Moreover, the fixing portion HLSc, the fixing portion HLSe, the fixing portion HLSd and the fixing portion HLSf are respectively disposed on left and right sides of the support member HLS. The headlight unit HL is fixed to a bracket (not shown) connected with the head pipe 21 through the fixing portion HLSa and the fixing portion HLSb. Also, the headlight unit HL is fixed to the left-side upper cover portion 301La and the right-side upper cover portion 301Ra through the fixing portion HLSc, the fixing portion HLSe, the fixing portion HLSd and the fixing portion HLSf.

As shown in FIG. 4, at the front vehicle cover portion 30, the reflector headlight HLRf and the projector headlight HLPr are respectively disposed on left and right sides of the head pipe 21, and thus the vehicle front-portion including the front vehicle cover portion 30 can be inhibited from being large-scale in an up and down direction compared with arrangements in which the reflector headlight HLRf and the projector headlight HLPr are arranged in an up and down direction.

Moreover, compared with arrangements in which the reflector headlight HLRf and the projector headlight HLPr are arranged in an up and down direction and overlap with the head pipe 21 in a front view, in the scooter-type vehicle 1 of the present invention, the reflector headlight HLRf and the projector headlight HLPr are disposed by effectively using spaces further left and right than the head pipe 21. Therefore, the degree of freedom of configuration of the reflector headlight HLRf and the projector headlight HLPr in a front and back direction of the vehicle can be enhanced without interference with the head pipe 21. So, the vehicle front-portion including the front vehicle cover portion 30 can be inhibited from being large-scale in a front and back direction of the vehicle.

Also, as shown in FIG. 7, in a top view, the rear end of the reflector headlight HLRf is located further forward than the rear end of the projector headlight HLPr. In this way, in the scooter-type vehicle 1 of the present invention, the reflector headlight HLRf whose front-and-back-direction length is shorter than that of the projector headlight HLPr is disposed in a manner that its rear end is located further forward than the rear end of the projector headlight HLPr, and thus the fuel feeding portion 50 can be disposed effectively by making flexible use of the space to the rear of, e.g. behind or directly behind, the reflector headlight HLRf.

More preferably, as shown in FIG. 4, in a front view, the reflector headlight HLRf is disposed such that at least a portion of the reflector Rf1 overlaps with a center line 21C of the head pipe 21, and the projector headlight HLPr is disposed such that at least a portion of the reflector Rf2 overlaps with the reflector Rf1 of the reflector headlight HLRf. In this way, the reflector headlight HLRf and the projector headlight HLPr can be disposed close to each other in a left and right direction of the vehicle, and thus even if the reflector headlight HLRf and the projector headlight HLPr are arranged left and right, the headlight unit HL can be inhibited from being large-scale in a left and right direction of the vehicle. Therefore, the vehicle front-portion can be inhibited from being large-scale.

Fuel Feeding Portion

As shown in FIG. 4 and FIG. 5, the fuel feeding portion 50 includes a fuel feeding opening portion 50a and a fuel feeding channel 50b. The fuel feeding portion 50 is disposed at a rear portion of the front vehicle cover portion 30. The fuel feeding opening portion 50a and the fuel feeding channel 50b are disposed further left than the head pipe 21 inside the front vehicle cover portion 30.

As shown in FIG. 7, in a top view, the fuel feeding channel 50b is disposed to the rear of, e.g. directly behind, the reflector headlight HLRf and on the left of the head pipe 21. As shown in FIG. 5, an upper or upmost end of the fuel feeding channel 50b is connected with the fuel feeding opening portion 50a, and a lower or lowermost end is connected with the fuel tank 51, so as to connect the fuel feeding opening portion 50a with the fuel tank 51. Also, the fuel feeding portion 50 supplies fuel from the fuel feeding opening portion 50a disposed at the opening portion 41 as shown in FIG. 3, and stores the fuel into the fuel tank 51 via the fuel feeding channel 50b.

In the scooter-type vehicle 1 of the present invention, the lighter reflector headlight HLRf in the headlight unit HL and the fuel feeding portion 50 are disposed on the left of the head pipe 21, and the heavier projector headlight HLPr in the headlight unit HL is disposed on the right of the head pipe 21. So, unevenness of weight balancing in the single headlight unit HL is made up for by using the fuel feeding portion 50, which can thus reduce effects of configuration of the headlight unit HL on unevenness produced by weight balancing of the vehicle front-portion in a left and right direction of the vehicle, so as to ensure the weight balancing of the vehicle front-portion in the left and right direction of the vehicle.

Also, as stated above, in the scooter-type vehicle 1 of the present invention, the reflector headlight HLRf whose front-and-back-direction length is shorter than that of the projector headlight HLPr is disposed such that its rear end is located further forward than the rear end of the projector headlight HLPr, and thus the fuel feeding portion 50 can be disposed effectively by making flexible use of the space in the rear of the reflector headlight HLRf. So, the degree of freedom of configuration of the fuel feeding portion 50 in a front and back direction of the vehicle can be enhanced. Therefore, in a situation where the reflector headlight HLRf and the fuel feeding portion 50 are disposed front and back on the left of the head pipe 21, the fuel feeding portion 50 can be disposed without interfering with the reflector headlight HLRf even if the vehicle front-portion is not large-scale in the front and back direction of the vehicle. Hence, the vehicle front-portion being large-scale in the front and back direction of the vehicle caused by configuration of the fuel feeding portion 50 can be inhibited while weight balancing of the vehicle front-portion in a left and right direction is ensured. Moreover, even if the fuel feeding portion 50 is disposed at a rear portion of the front vehicle cover portion 30, the front vehicle cover portion 30 can be inhibited from being large-scale in the front and back direction of the vehicle, and thus a space above the pedal or footboard 33 can be inhibited from becoming smaller in a front and back direction. So, comfort can be inhibited from being reduced when the rider places feet on the pedal or footboard 33.

Also, as shown in FIG. 4, in a front view of the fuel feeding opening portion 50a, at least a portion thereof overlaps with the reflector headlight HLRf in a left and right direction. As shown in FIG. 5, in a side view, the fuel feeding opening portion 50a is located at a height substantially the same as the upper end portion of the reflector headlight HLRf and, in the front and back direction of the vehicle, at least a portion thereof overlaps with the head pipe 21. The fuel feeding opening portion 50a includes a fuel feeding cap 50a1, and an opening of the fuel feeding opening portion 50a is opened or closed through the fuel feeding cap 50a1. Furthermore, the fuel feeding opening portion 50a may further have a lid body covering the upper side of the fuel feeding cap 50a1.

Moreover, as shown in FIG. 5, it is preferable that, in a side view of the fuel feeding channel 50b, at least a portion thereof overlaps with the head pipe 21 in a front and back direction of the vehicle, and in an up and down direction of the vehicle, located between a horizontal line passing through an upper end of the headlight unit HL and a horizontal line passing through a lower end of the headlight unit HL.

In this way, in the fuel feeding channel 50b, the fuel feeding portion 50 can be disposed effectively by making flexible use of the space to the rear of, e.g. directly behind, the reflector headlight HLRf on the premise that a portion between the horizontal line passing through the upper end of the headlight unit HL and the horizontal line passing through the lower end of the headlight unit HL does not interfere with the reflector headlight HLRf. Therefore, the vehicle front-portion being large-scale in the front and back direction of the vehicle caused by configuration of the fuel feeding portion 50 can be further inhibited while weight balancing of the vehicle front-portion in a left and right direction is ensured.

Moreover, as shown in FIG. 5, the fuel feeding channel 50*b* further includes a sub tank 50*c* for adjusting a feeding or transporting speed of the fuel and a fuel feeding pipe 50*d*.

As shown in FIG. 4, in a front view of the sub tank 50*c*, at least a portion thereof overlaps with the reflector headlight HLRf in a left and right direction. As shown in FIG. 7, in a top view, the sub tank 50*c* is disposed in the rear of the reflector headlight HLRf and on the left of the head pipe 21, and as shown in FIG. 5, in a side view, at least a portion thereof overlaps with the head pipe 21 in a front and back direction of the vehicle body. Moreover, as shown in FIG. 5, in a side view, the sub tank 50*c* is disposed below the fuel feeding opening portion 50*a*, and located at a height substantially the same as the headlight unit HL (the reflector headlight HLRf). In other words, in a side view of the sub tank 50*c*, at least a portion thereof is located between a horizontal line passing through an upper end of the headlight unit HL and a horizontal line passing through a lower end of the headlight unit HL. It is more preferable that, in a side view of the sub tank 50*c*, at least a portion thereof is disposed to overlap with the reflector headlight HLRf of the headlight unit HL in a front and back direction of the vehicle.

The fuel feeding pipe 50*d* is inserted into the sub tank 50*c*, an upper end thereof is connected with the fuel feeding opening portion 50*a*, and a lower end thereof is connected with the fuel tank 51, so as to connect the fuel feeding opening portion 50*a* with the fuel tank 51. Also, it is more preferable that, at the fuel feeding pipe 50*d*, at least a portion of the portion lower than the sub tank 50*c* overlaps with the front frame portion 22 in a front and back direction of the vehicle body.

In the scooter-type vehicle 1 of the present invention, the sub tank 50*c* is disposed at a height substantially the same as that of the headlight unit HL, and in a side view, at least a portion of the sub tank 50*c* is disposed to overlap with the reflector headlight HLRf of the headlight unit HL in a front and back direction of the vehicle, so, the vehicle front-portion can be inhibited from being large-scale in an up and down direction and in a front and back direction while weight balancing of the vehicle front-portion in a left and right direction of the vehicle is preferably ensured.

In addition, the fuel feeding channel 50*b* is not limited to including the sub tank 50*c*, and may also not be provided with the sub tank 50*c*.

The above describes the embodiments of the present invention, but professionals can make various design changes without departing from the scope of the present invention based on the teaching of the present invention, and thus the protection scope of the present invention is not limited to the above embodiments, and also includes various design changes not departing from the present invention as recited in the claims.

For example, the foot rest portion 33 of the present invention is not limited to the pedal or footboard in the embodiment, as long as the feet can be at least placed at the foot rest portion 33 disposed further forward than and below the saddle portion 9 to ride. That is, the foot rest portion 33 may be wholly flat, or protrude upwards in the central portion, or be concave and convex on a portion of the central portion.

Moreover, composition of the vehicle cover is not limited to the embodiment, as long as it includes the foot rest portion 33, the front vehicle cover portion 30 and the rear vehicle cover portion 31, which may also include cover portions other than them. Also, composition of the front vehicle cover portion 30 is not limited to the embodiment, it may also be formed by a plurality of cover components, and positions where the cover components are separated are not limited to the embodiment.

Also, the composition of the main switch 14 is not limited to the embodiment, which, in a rear view of the front vehicle cover portion 30, may be disposed centrally or be disposed at one side where the fuel feeding portion 50 is not disposed further right or left than the head pipe 21.

Also, the structure of the headlight unit HL is not limited to the embodiment, and positions of high-beam light and low-beam light may also be opposite. It is feasible that the headlight unit HL at least has the reflector headlight HLRf and the projector headlight HLPr, which may also not include the position lamp HLP. Moreover, the type of the light source S1 and the light source S2 is not limited to the embodiment, which may be any type, bulbs or LEDs. Then, in the headlight unit HL, the reflector headlight HLRf and the projector headlight HLPr may be integral or separated.

Then, configuration of the reflector headlight HLRf and the projector headlight HLPr of the headlight unit HL, configuration of the storage portion 40 and configuration of the fuel feeding portion 50 are not limited to the above forms. For example, the reflector headlight HLRf and the projector headlight HLPr may also be disposed further right and further left than the head pipe 21 respectively. In such a case, the storage portion 40 and the fuel feeding portion 50 are disposed in conjunction with the positions of the reflector headlight HLRf and the projector headlight HLPr in a left and right direction of the vehicle. In more detail, in the situation where the reflector headlight HLRf and the projector headlight HLPr are disposed further right and further left than the head pipe 21 respectively, the storage portion 40 is disposed on the left of the center line C of the rear cover portion 302, the opening portion 41 used for exposing the fuel feeding portion 50 disposed on the right of the center line C of the rear cover portion 302. The fuel feeding portion 50 is disposed further right than the head pipe 21.

Also, in addition to scooter-type vehicles, the present invention may also be applied to other scooter-type vehicles such as motor vehicles, sport vehicles, light vehicles, All Terrain Vehicles (ATVs) and other four-wheeled vehicles.

Effects of the Embodiments

As stated above, the scooter-type vehicle 1 in this embodiment includes: a vehicle frame 2, including a head pipe 21; a front wheel 8, rotatably supported by the head pipe 21; a saddle portion 9, located further rearwards than the head pipe 21; a power unit 10, supported by the vehicle frame 2, and located below the saddle portion 9 in a side view of the vehicle; a vehicle cover, including a foot rest portion 33 disposed further forward and lower than the saddle portion 9, a front vehicle cover portion 30 extending upwards from a front end of the foot rest portion 33 and covering the head pipe 21, and a rear vehicle cover portion 31 extending rearwards from a rear end of the foot rest portion 33 and covering a space below, e.g. directly underneath, the saddle portion 9; a headlight unit HL, disposed at a front portion of the front vehicle cover portion 30; a fuel tank 51, disposed below, e.g. directly underneath, the foot rest portion 33; and a fuel feeding portion 50, feeding fuel to the fuel tank 51. The headlight unit HL includes: a reflector headlight HLRf, including a first light source S1 disposed at one side further right or left than the head pipe 21, and a first reflector Rf1 reflecting light from the first light source S1; and a projector headlight HLPr, including a second light source S2 disposed at the other side further right or left than the head pipe 21, a second reflector Rf2 reflecting light from the second light source S2, and a lens HLPrL disposed in front of the second light source S2 and in a convex shape toward the front of the vehicle, and in a side view, the projector headlight being disposed in a manner that a portion thereof overlaps with the reflector headlight HLRf; and in a top view, a rear end of the reflector headlight HLRf is located further forward than a rear end of the projector headlight HLPr. The fuel feeding portion 50 includes: a fuel feeding opening portion 50a, disposed at a rear portion of the front vehicle cover portion 30, and disposed at the one side further to a right or left side of the head pipe 21; and a fuel feeding channel 50b, disposed at the one side inside of the front vehicle cover portion 30, and connecting the fuel feeding opening portion 50a with the fuel tank 51.

According to this embodiment, in the scooter-type vehicle 1, the reflector headlight HLRf and the projector headlight HLPr are respectively arranged left and right by taking the head pipe 21 as the center, which can thus inhibit the vehicle front-portion including the front vehicle cover portion 30 from being large-scale in an up and down direction compared with the form in which the reflector headlight HLRf and the projector headlight HLPr are arranged in the up and down direction.

Also, compared with the form in which the reflector headlight HLRf and the projector headlight HLPr are disposed in front of the head pipe 21, in the scooter-type vehicle 1 of this embodiment, as the reflector headlight HLRf and the projector headlight HLPr are disposed by effectively making use of the space further left and right the head pipe 21, the degree of freedom of configuration of the reflector headlight HLRf and the projector headlight HLPr in a front and back direction of the vehicle can be enhanced without interfering with the head pipe 21. Therefore, the vehicle front-portion including the front vehicle cover portion 30 can be inhibited from being large-scale in a front and back direction of the vehicle.

However, it is difficult to ensure weight balancing of the vehicle front-portion as the reflector headlight HLRf and the projector headlight HLPr with different weight are respectively disposed further right and left than the head pipe 21. On the other hand, in the scooter-type vehicle 1 of the embodiment, to enhance convenience of the fuel feeding operation, the focus is on the fuel feeding portion 50 disposed at the rear portion of the front vehicle cover portion 30 further right or left than the head pipe 21. Therefore, in the scooter-type vehicle 1 of the embodiment, the lighter reflector headlight HLRf and the fuel feeding portion 50 are disposed at one side further right or left than the head pipe 21, and the heavier projector headlight HLPr is disposed at the other side further right or left than the head pipe 21. So, unevenness of weight balancing in the single headlight unit HL is made up for by using the fuel feeding portion 50 disposed at one side in a left and right direction of the vehicle, which can thus reduce effects of configuration of the headlight unit HL on unevenness produced by weight balancing of the vehicle front-portion in a left and right direction of the vehicle, so as to ensure the weight balancing of the vehicle front-portion in the left and right direction of the vehicle.

In addition, in the scooter-type vehicle 1 of the embodiment, the reflector headlight HLRf whose front-and-back-direction length is shorter than that of the projector headlight HLPr is disposed in a manner that the rear end thereof is located further forward than the rear end of the projector headlight HLPr, so that flexible use of the space to the rear of the reflector headlight HLRf can be effectively made, thereby enhancing the degree of freedom of configuration of the fuel feeding portion 50 in a front and back direction of the vehicle. Therefore, in a situation where the reflector headlight HLRf and the fuel feeding portion 50 are front-and-back disposed in a left or right direction of the vehicle, even if the vehicle front-portion is not large-scale in the front and back direction of the vehicle, the fuel feeding portion 50 may also be disposed in a manner of not interfering with the reflector headlight HLRf. So, the vehicle front-portion being large-scale in the front and back direction of the vehicle caused by configuration of the fuel feeding portion 50 can be inhibited while weight balancing of the vehicle front-portion in a left and right direction is ensured.

On the basis of the above, the embodiment can provide a scooter-type vehicle 1 with a projector headlight HLPr that can enhance convenience of fuel feeding operation and can inhibit the vehicle front-portion from being large-scale.

The invention claimed is:
1. A scooter-type vehicle, comprising:
a vehicle frame comprising a head pipe;
a front wheel, rotatably supported by the head pipe;
a saddle portion, located further rearward than the head pipe;
a power unit, supported by the vehicle frame, and located below or directly underneath the saddle portion in a side view of the vehicle;
a vehicle cover comprising a foot rest portion disposed further forward and lower than the saddle portion, a front vehicle cover portion extending upwards from a front end of the foot rest portion and covering the head pipe, and a rear vehicle cover portion extending backwards from a rear end of the foot rest portion and covering a space below or directly underneath the saddle portion;
a headlight unit disposed at a front portion of the front vehicle cover portion;
a fuel tank, disposed below the foot rest portion; and
a fuel feeding portion, for feeding fuel to the fuel tank;
wherein the headlight unit comprises: a reflector headlight comprising a first light source disposed at one side further right or left than the head pipe, and a first reflector reflecting light from the first light source; and a projector headlight, comprising a second light source disposed at the other side further right or left than the head pipe, a second reflector reflecting light from the second light source, and a lens disposed in front of the second light source and the lens being disposed in a convex shape toward the front of the vehicle, and in a side view the projector headlight being disposed such that a portion thereof overlaps with the reflector headlight; and in a top view of the headlight unit, a rear end of the reflector headlight is located further forward than a rear end of the projector headlight,
the fuel feeding portion comprises: a fuel feeding opening portion disposed at a rear portion of the front vehicle cover portion, and disposed at the one side further right or left than the head pipe; and a fuel feeding channel disposed at the one side inside the front vehicle cover portion, and connecting the fuel feeding opening portion with the fuel tank, and
wherein, in a side view, the fuel feeding portion is disposed such that at least a portion thereof overlaps with the head pipe in a front and back direction of the vehicle, and, in an up and down direction of the vehicle, at least a portion of the fuel feeding portion is located between a horizontal line passing through an upper end of the headlight unit and a horizontal line passing through a lower end of the headlight unit.

2. The scooter-type vehicle according to claim 1, wherein, in a front view, at least a portion of the first reflector of the reflector headlight overlaps with a center line of the head pipe, and at least a portion of the second reflector of the projector headlight overlaps with the first reflector of the reflector headlight.

3. The scooter-type vehicle according to claim 2, wherein at least part of the fuel feeding portion is disposed to the rear of or behind the reflector headlight.

4. The scooter-type vehicle according to claim 1, wherein at least part of the fuel feeding portion is disposed to the rear of or behind the reflector headlight.

5. The scooter-type vehicle according to claim 1, wherein the fuel feeding channel comprises a sub tank and a fuel feeding pipe, and the fuel feeding pipe is inserted into the sub tank disposed below the fuel feeding opening portion and in a side view the headlight unit is disposed to overlap with at least a portion of the sub tank in the up and down direction of the vehicle and to overlap with at least a portion of the sub tank in the front and back direction of the vehicle.

6. The scooter-type vehicle according to claim 5, wherein, in a front view, at least a portion of the first reflector of the reflector headlight overlaps with a center line of the head pipe, and at least a portion of the second reflector of the projector headlight overlaps with the first reflector of the reflector headlight.

7. The scooter-type vehicle according to claim 6, wherein at least part of the fuel feeding portion is disposed to the rear of or behind the reflector headlight.

8. The scooter-type vehicle according to claim 5, wherein at least part of the fuel feeding portion is disposed to the rear of or behind the reflector headlight.

* * * * *